No. 120,846. Patented Nov. 14, 1871.

N. B. Baldwin, Propelling Power.

Witnesses:
C. Raettig.
Gustave Dieterich

Inventor:
N. B. Baldwin
Per
Attorneys.

UNITED STATES PATENT OFFICE.

NATHANIEL B. BALDWIN, OF CHICAGO, ILLINOIS.

IMPROVEMENT IN PROPELLING-POWERS.

Specification forming part of Letters Patent No. 120,846, dated November 14, 1871.

*To all whom it may concern:*

Be it known that I, NATHANIEL B. BALDWIN, of Chicago, in the county of Cook and State of Illinois, have invented a new and useful Improvement in Propelling-Power; and I do hereby declare that the following is a full, clear, and exact description thereof, which will enable others skilled in the art to make and use the same, reference being had to the accompanying drawing forming part of this specification, in which—

Figure 1:
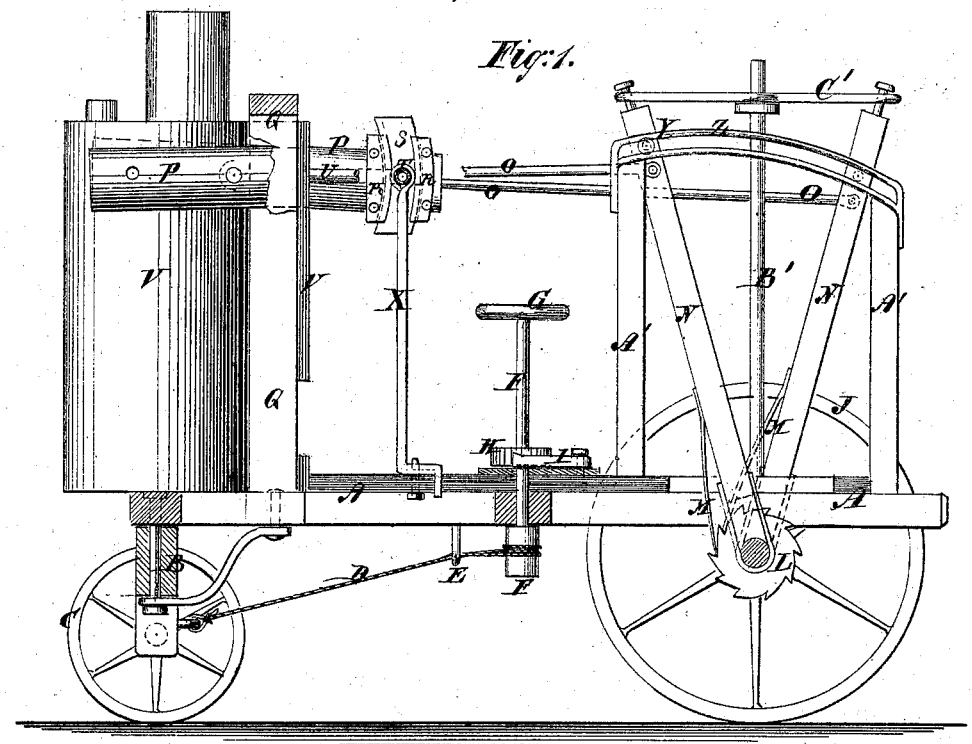
Figure 2:
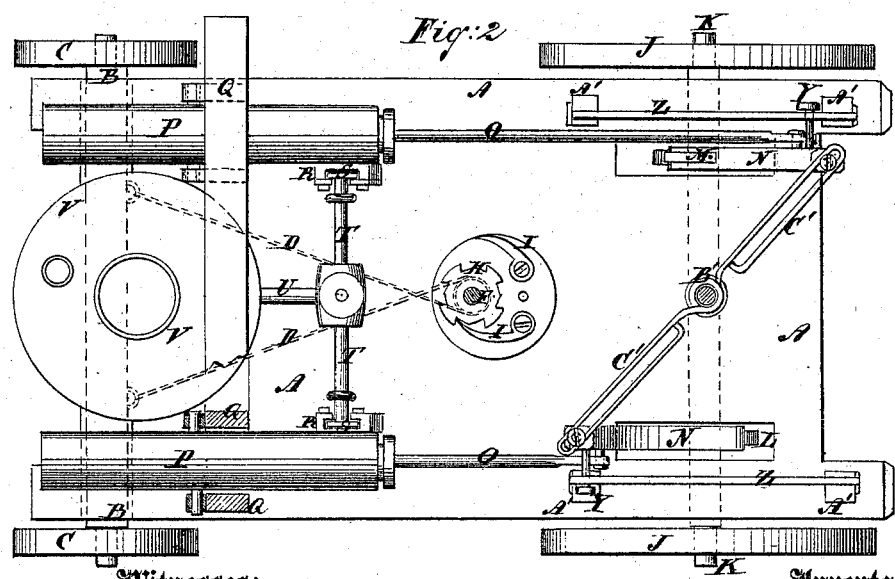

Figure 1 is a detail sectional view of my improved apparatus. Fig. 2 is a top view of the same.

Similar letters of reference indicate corresponding parts.

My invention has for its object to furnish an improved apparatus for drawing plows, wagons, reapers, mowers, and other machines, and for propelling thrashers and other stationary machinery, and which shall be simple in construction, efficient in operation, and easily controlled; and it consists in the construction and combination of various parts of the apparatus, as hereinafter more fully described.

A is the platform of the machine, to the center of the forward end of which is pivoted, by a king-bolt, the forward axle B, upon the journals of which the forward wheels C revolve. The forward axle B is inclined to one side or the other to guide the machine by the chains D, the forward ends of which are secured to the axle B near its ends. The chains D pass over a guide, E, attached to the platform A, and their rear ends are wound in opposite directions around, and are attached to, the lower end of the vertical shaft F which passes up through the middle part of the platform A, and has a hand-wheel, G, attached to its upper end for convenience in operating it. To the shaft F is attached the ratchet-wheel H, the teeth of which are so formed that one or the other of the pawls I will take hold of it and hold it according as the said shaft F may be turned in one or the other direction. J are the rear wheels, which are rigidly attached to the ends of the rear axle K so as to be carried with said axle in its revolution. The axle K revolves in bearings attached to the rear part of the platform A, and to it, near its ends, are attached ratchet-wheels L, upon which the pawls M attached to the levers N take hold, so that the axle K may be revolved by operating the levers N. The lower ends of the levers N are slotted to receive the ratchet-wheels L, and are pivoted to and connected with the axle K by means of straps passing around the said axle, and the ends of which are attached to the said levers. The levers N pass up through slots in the platform A, and their upper ends are pivoted to the rear ends of the piston-rods O, so as to be operated by the movements of said piston-rods. The piston-rods O may be of any desired length, and enter the cylinders P, which cylinders are pivoted to a strong frame-work, Q, attached to the platform A, so that the said cylinders may oscillate to adapt their position to the varying direction of the piston-rods O as their forward ends move through the arc of a circle. To the inner sides of the forward ends of the cylinders P are attached curved ways R, in which work the curved slides or plates S attached to the outer ends of the steam-pipes T. By this construction, as the piston-rods O in their outward movement come to the end of their stroke the holes through the ways R and plates S come opposite each other, admitting the steam, which forces the pistons back and operates the levers N. As the pistons move back, the movement of the said cylinders shuts off the steam by moving the hole in the ways R away from the hole in plates S. The inner ends of the steam-pipes T are connected with the outer end of the steam-pipe U, the other end of which is connected with the boiler V, from which it receives the steam, and which is secured to the forward part of the platform A. W is a valve or cock, which is placed at the point where the steam-pipes T U meet to enable the steam to be shut off when required. The outer ends of the steam-pipes T are supported by standards X attached to the platform A. The upper ends of the levers N are guided and made to move in a vertical plane by pins Y attached to them, and which move through the curved slot in the guides Z attached to and supported by standards A', the lower ends of which are attached to the platform A. B' is a standard attached to the platform A in such a position that its upper end may be midway between the upper ends of the levers N when said levers are parallel with each other. To the upper end of the standard B' is pivoted the center of cross-bar C', the ends of which are slotted to receive pins attached to the ends of the levers N, so that when one of said levers is operated by the steam acting upon the piston connected with said lever it may operate the other lever to bring the other cylinder into position to take steam, and so on, the levers N working alternately. A single extra cylinder may be placed upon the forward part of the frame A in a reversed position, and so arranged as to operate the levers for convenience in backing. The cylinders and ratchet-wheels may be covered or incased to protect them from mud, dust, &c.

Having thus described my invention, I claim as new and desire to secure by Letters Patent—

1. The combination of the ways R and curved plates S with the oscillating steam-cylinders P and stationary steam-pipes T, substantially as herein shown and described, and for the purpose set forth.

2. The combination of the ratchet-wheels L, pawls M, and levers N with the axle or shaft K and piston-rods O of the pivoted steam cylinders P, substantially as herein shown and described, and for the purpose set forth.

3. The combination of the standard B' and pivoted and slotted cross-bar C' with the levers N and piston-rods O of the pivoted steam-cylinders P, substantially as herein shown and described, and for the purpose set forth.

NATHANIEL B. BALDWIN.

Witnesses:
HURBERT C. DEXTER,
J. W. BALDWIN.

(94)